United States Patent [19]
Forrester

[11] Patent Number: 5,694,771
[45] Date of Patent: Dec. 9, 1997

[54] DRIVE MECHANISM

[76] Inventor: Craig Forrester, 25 Citrus Avenue, Waihi Beach, New Zealand

[21] Appl. No.: 611,780

[22] Filed: Mar. 7, 1996

[30] Foreign Application Priority Data

Mar. 13, 1995 [NZ] New Zealand ............... 270693

[51] Int. Cl.$^6$ ............................................. F16D 33/02
[52] U.S. Cl. .................... 60/352; 60/494; 415/73; 416/177
[58] Field of Search ............... 60/330, 352, 487, 60/494; 415/71, 72, 73; 416/177

[56] References Cited

U.S. PATENT DOCUMENTS

| 2,389,174 | 11/1945 | Whitworth | 60/332 |
| 4,150,542 | 4/1979 | Spears | 60/494 |
| 4,672,810 | 6/1987 | Marlowe | 60/332 |

FOREIGN PATENT DOCUMENTS 765664  6/1934  France ............................. 60/487

*Primary Examiner*—F. Daniel Lopez
*Attorney, Agent, or Firm*—Bell, Seltzer, Park & Gibson

[57] ABSTRACT

The variable speed drive mechanism includes an input member (17) and an output member (18), each rotatable within a housing (11) filled with fluid. The input and output members each have helical vanes (26) that are in a close running fit with sleeves (21, 22) within the housing. The amount of axial overlap of the sleeves with the helical vanes of either the input member or the output member is adjustable. Rotation of the input member causes the helical vanes of the input member to pump the fluid towards the helical valves of the output member, causing the output member to rotate. The ratio of the speed of the output member with respect to the input member is varied, by varying the axial length of overlap.

10 Claims, 1 Drawing Sheet

DRIVE MECHANISM

This invention relates to drive mechanisms and particularly to drive mechanisms adapted to provide a drive from one rotatable member to another at a speed difference.

According to one aspect of the present invention, there is provided a drive means including a housing, the housing receiving a drive fluid, an input member and an output member, the input member and output member both being rotatable within the housing, the input member being formed with vane means which are a close running fit within the housing, whereby rotation of the input member causes fluid to be pumped past the input member, the output member being formed with vane means which are a close running fit within the housing, whereby the fluid pumped by the input member is forced to flow through the vane means of the output member, which is thereby caused to rotate.

Preferably the vane means on the input and/or output members are of helical formation about the axis of rotation of the member. Each vane is conveniently of rectangular or square cross-sections.

conveniently the axial length of overlap of the housing over the input or the output member is selected to provide a desired speed ratio between the input and output member.

Preferably said overlap is axially adjustable, whereby to set or achieve a required speed ratio.

To this end, said housing may be formed as two co-axial parts, one part overlapping the input member and the other part overlapping the output member, said parts being relatively axially adjustable.

Advantageously, the input and output members and the housing are enclosed in a casing to provide a return circuit for the fluid.

In order to maintain axial alignment of the input and output members, they may both be mounted through bearings to a common shaft.

One preferred embodiment of the invention is described, by way of example only, with reference to the accompanying drawings, in which.

Figure 1:
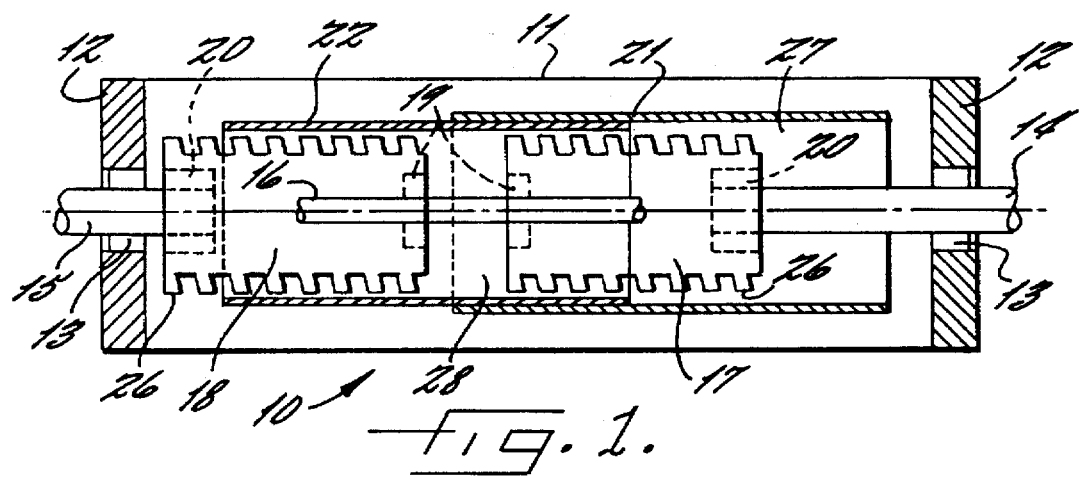
FIG. 1 is a longitudinal section in a plane including the axis, of drive means according to the invention.

In the drawings, drive means 10 includes an oil-tight outer casing formed of a tubular body 11 closed by end plates 12 each holding a central bearing and seal means 13. The bearing and seal means 13 carry rotatable power input and power output shafts 14, 15 respectively. An auxiliary shaft 16 coaxial with the input and output shaft 5, 14, 15 is held for rotation by bearings in the opposing end faces of the shafts 14, 15.

The auxiliary shaft 16 carries co-axially thereon two substantially identical input and output members 17, 18 by means of bearings 19. The members 17, 18 respectively are connected by splines 20 or other rotary drive elements, whereby rotation of the input shaft 14 causes corresponding rotation of the input member 17 and rotation of the output member 18 causes corresponding rotation of the output shaft 15.

A pair of telescopic sleeves 21, 22 are mounted co-axial with the members 17, 18. The sleeve 21 is axially fixed, but the sleeve 22 is moveable longitudinally by means of a collar 23 affixed to one end thereof. Outer lands 24 on the collar 23 are a sliding fit in the tubular body 11 and the collar 23 and sleeve 22 are moved by rotation of a threaded bar 25 engaged in a threaded bore in the collar 23.

The input and output members 17, 18 are formed with external helical vanes, ribs or threads 26 the outer surfaces of which are a close fit inside the sleeves 21, 22.

In use, the outer casing is substantially filled with a suitable liquid, such as an appropriate grade of oil. Considering FIG. 1, rotation of the input shaft 14 and thereby the input member 17 causes the helical vanes 26 to tend to draw the liquid towards the left, in the space 27 within the sleeve 21. When the liquid is entrapped between the vanes 26 and the internal surface of the sleeve 21, the liquid is propelled towards the left and pumped into the space 28 between the input and output members 17, 18 and the internal surface of the sleeve 22.

With the sleeve 22 in the position shown in FIG. 1, the only escape for the liquid from the space 28 is between the vanes 26, being trapped therein by the internal surface of the sleeve 22. This helical path of flow imposed on the liquid causes a reaction force on the vanes 26 of the output member 18, causing it to rotate in the same direction as the input member 17. Thus, the output shaft 15 is driven to rotate in the same direction of rotation as the input shaft 14. If the input and output members 17, 18 are identical, the speed of the output shaft 15 will be somewhat less than the speed of the input shaft 14, due to leakage of the liquid between vanes 16 and the sleeves 21, 22.

When the sleeve 22 extends over the full length of the output member 18, the leakage is at a minimum, so the speeds of the shafts 14, 15 are closest. However, when the sleeve 22 is retracted somewhat, as in FIG. 1, by rotation of the threaded bar 25, the leakage is increased somewhat, so that the output shaft 15 will rotate slower.

Figure 2:
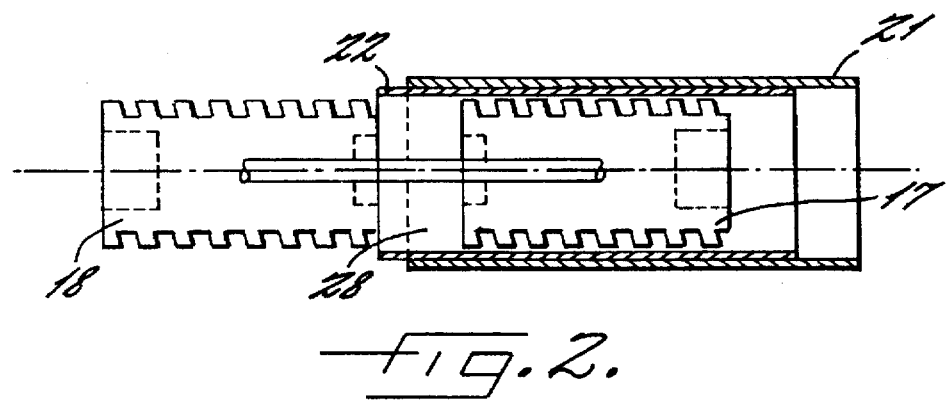
FIG. 2 shows part of FIG. 1 at a different stage of adjustment.
Figure 3:
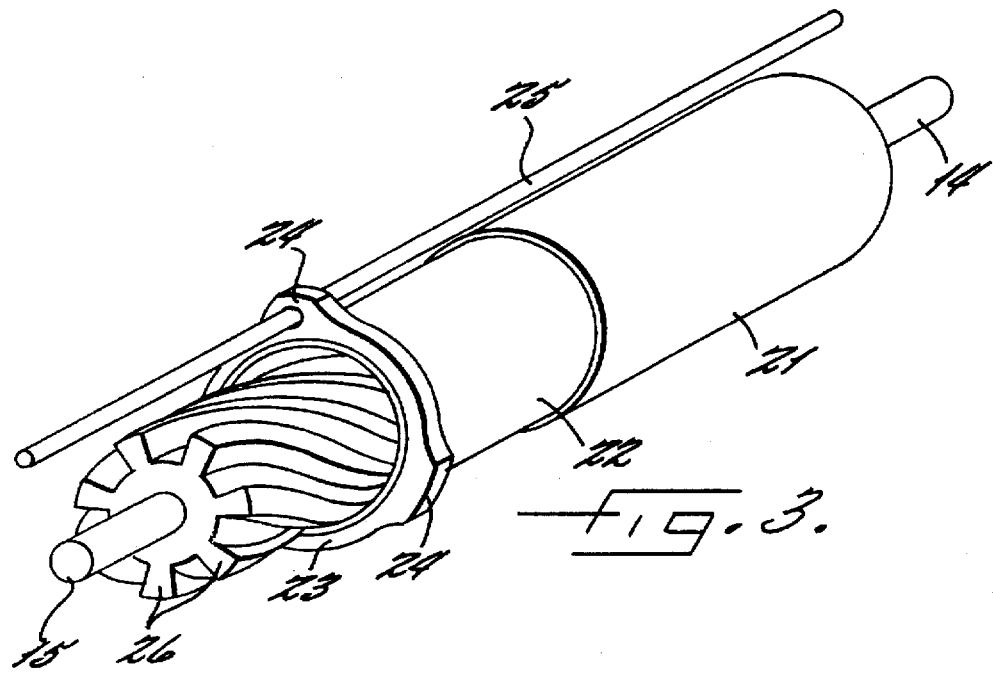
FIG. 3 is a perspective view of part of FIG. 1.

Thus controlled slowing of the output shaft 15 is increased as the sleeve 22 is moved to the right until the condition shown in FIG. 2 is reached. In this position, the sleeve 22 is clear of the output member 18, so no liquid flow occurs along the vanes thereof. Thus the member 18 is not caused to rotate and the drive between the input and output shaft 14, 15 is effectively de-coupled.

The range of speed ratios between the input and output shafts 14, 15 can be adjusted by providing a different helix angle for the vanes 26 on the output member 18 from those on the input member 17.

I claim:

1. A drive means including a housing, the housing receiving a drive fluid, an input member and an output member, the input member and output member both being rotatable within the housing and positioned with the housing axially overlapping at least a part of each of said members, the input member being formed with vane means which are a close running fit within the housing, whereby rotation of the input member causes fluid to be pumped past the input member, the output member being formed with vane means which are a close running fit within the housing, whereby the fluid pumped by the input member is forced to flow through the vane means of the output member, which is thereby caused to rotate, and wherein the axial length of overlap of the housing over the input or the output member is selectable to provide a desired speed ratio between the input and output member.

2. A drive means according to claim 1, wherein the vane means on the input and/or output members are of helical formation about the axis of rotation of the member.

3. A drive means according to claim 2, wherein each vane is of rectangular or square cross-section.

4. A drive means according to claim 1, wherein the drive fluid is a suitable oil or other viscous liquid.

5. A drive means according to claim 1, wherein said overlap is axially adjustable, whereby to set or achieve a required speed ratio.

6. A drive means according to claim 1, wherein said housing is formed as two co-axial parts, one part overlapping the input member and the other part overlapping the output member, said parts being relatively axially adjustable, in a telescoping fashion.

7. A drive means according to claim 1, wherein the input and output members and the housing are enclosed in a fluid tight casing to provide a return circuit for the fluid.

8. A drive means according to claim 1, wherein the input and output members, are both mounted through bearings to a common shaft.

9. A drive assembly, comprising:

a casing, the casing containing a drive fluid;

a tubular housing supported within the casing, the housing comprising at least two tubular parts assembled in telescoping relationships;

an input member, an output member, wherein the input and output members are supported for co-axial rotation, at least a part of each member being within the housing, the input and output members having peripheral vane means, which are sized to fit closely within the tubular housing, the arrangement being such that rotation of the input member causes drive fluid to flow along the housing in the direction of the output member, and through the vane means of the output member, causing the output member to rotate.

10. A drive assembly according to claim 1, wherein the amount by which the housing overlaps the input and output members is adjustable.

* * * * *